United States Patent [19]
Backer

[11] Patent Number: 4,986,038
[45] Date of Patent: * Jan. 22, 1991

[54] COMPONENT EXHIBIT SYSTEM

[76] Inventor: Bruce E. Backer, 4517 Newport Ave., San Diego, Calif. 92107

[*] Notice: The portion of the term of this patent subsequent to Dec. 15, 2004 has been disclaimed.

[21] Appl. No.: 106,794

[22] Filed: Oct. 13, 1987

Related U.S. Application Data

[63] Continuation of Ser. No. 900,161, Aug. 25, 1986.

[51] Int. Cl.$^5$ .............................................. E04B 7/16
[52] U.S. Cl. .................................... 52/71; 52/286; 52/585; 160/351
[58] Field of Search ............ 52/70, 71, 285, 286, 52/585; 160/351, 221

[56] References Cited

U.S. PATENT DOCUMENTS

| | | | |
|---|---|---|---|
| 1,000,395 | 8/1911 | Frost | 52/285 |
| 2,141,397 | 12/1938 | Locke | 52/285 |
| 2,862,254 | 12/1958 | Meek | 52/585 |
| 3,842,555 | 10/1974 | Korell | 52/285 |
| 4,103,465 | 8/1978 | McDonald | 52/127.12 |
| 4,121,645 | 10/1978 | Behr | 160/351 |
| 4,161,850 | 7/1979 | Peterson | 52/70 |
| 4,185,430 | 1/1980 | Gartung | 52/285 |
| 4,263,761 | 4/1981 | Kristoff | 52/241 |
| 4,455,102 | 6/1984 | Baroi52 | 285/ |
| 4,571,906 | 2/1986 | Ashton | 52/236 |
| 4,573,513 | 3/1986 | Small | 160/351 |
| 4,593,508 | 6/1986 | Caratolo | 52/239 |
| 4,624,083 | 11/1986 | Diffrient | 52/70 |
| 4,682,457 | 7/1987 | Spencer | 52/221 |

FOREIGN PATENT DOCUMENTS

| | | | |
|---|---|---|---|
| 227917 | 11/1962 | Austria | 52/585 |
| 249977 | 10/1966 | Austria | 52/585 |
| 197594 | 10/1986 | European Pat. Off. | 52/285 |
| 817865 | 10/1951 | Fed. Rep. of Germany | 52/585 |
| 2733283 | 2/1979 | Fed. Rep. of Germany | 52/285 |
| 97119 | 12/1939 | Sweden | 52/585 |
| 795078 | 5/1958 | United Kingdom | 52/585 |
| 1600990 | 10/1981 | United Kingdom | 52/238.1 |

Primary Examiner—Henry E. Raduazo
Attorney, Agent, or Firm—Spensley Horn Jubas & Lubitz

[57] ABSTRACT

A portable modular wall assembly system with interchangeable interconnecting elements for creating display booths and room dividers. The system comprises a series of modular panels of different shape, construction and function, together with a series of connector elements adapted to interconnect with each of said panels to form a variety of structures.

16 Claims, 6 Drawing Sheets

COMPONENT EXHIBIT SYSTEM

This is a continuation of application Ser. No. 900,161 filed on Aug. 25, 1986, now U.S. Pat. No. 4,712,336.

FIELD OF THE INVENTION

This invention relates generally to portable wall structures and more particularly to a lightweight modular portable system for creation of display booths.

DISCUSSION OF THE PRIOR ART

The present invention is particularly adapted to the requirements of exhibitors at trade shows. A trade show exhibitor rents exhibition hall floor space at a particular location of a designated size. The exhibitor must make his own arrangements for means for designating the boundaries of the display area he has rented and separating his area from the area of adjacent exhibitors. Typically this is done by means of a display booth of some type. This can be done by placement of furniture pieces, by the use of open framework with cloth material or banners hanging from them, or by the means of complete wall structures particularly adapted for the uses of the exhibitor, including display of products and literature.

Relatively complete exhibit booths prepared especially for a particular exhibitor, or "custom exhibiting," tend to be extremely expensive and, while to some degree they are portable, are not easily transported, handled, set up and taken down. Such a booth in its packing crate may weigh a total of several thousand pounds. Modular systems, which are either purchased by particular exhibitors or rented at the scene of a trade show, while being somewhat adaptable to various exhibit users, generally comprise relatively large wall elements which merely abut each other and are not normally interconnectable and interchangeable to create structures of various heights, widths or angles. Additionally, these structures tend to be bulky, difficult to handle and relatively heavy. Stated another way, they are not normally readily adaptable to a variety of use requirements; Further, modular systems now available have either visible external structural framework or connective systems, which limit design capabilities and reduce appearance.

SUMMARY OF THE INVENTION

It is a primary object of the present invention to provide a modular panel wall system from which a large variety of wall or booth structures may be created at the site of ultimate use. The structure is also easily broken down and is lightweight and simple to pack and transport. The system of this invention, for equivalent wall area, is typically no more than one fourth the weight of the prior art systems described above.

The wall system of this invention is comprised primarily of a series of rectangular lightweight panels having a rigid frame and a foam or honeycomb core. The frame members are formed with elongated channel elements having a box-like cross section, each channel element being adapted to receive a flat bar which engages stop means in the channel, such as the shank of a screw or pin extending through the channel at a specific location. The flat bar has a plurality of configurations and alternatively is connected with a hinge element. The various configurations of flat bars and hinge elements enable the panel members to be stacked, interconnected in lateral adjacent relationship and formed at any desired angle one with respect to the other, as well as creating T-shaped wall element structures.

A kit comprising a multiplicity of similar wall panels and a multiplicity of connector elements of a plurality of configurations can be employed to create a structure of any shape or complexity.

BRIEF DESCRIPTION OF THE DRAWING

The objects, advantages and features of this invention will be more readily appreciated from the following detailed description when read in conjunction with the accompanying drawing, in which.

DESCRIPTION OF THE PREFERRED EMBODIMENTS

Figure 1:
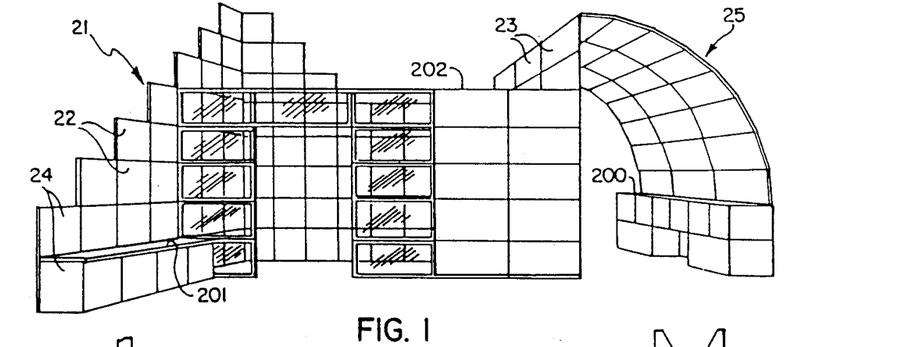
FIG. 1 is a perspective view of a typical display assembly constructed with components of the present invention.

With reference now to the drawing, and more particularly 1 thereof, there is shown a complex structure 21 employing panel and connector elements of the present invention. Note that the panels can be joined not only in vertical stacked (22) and horizontally connected (23) arrangements, but can create T-shaped intersections 24 of panels as well as combinations of different angles 25.

Figure 2:
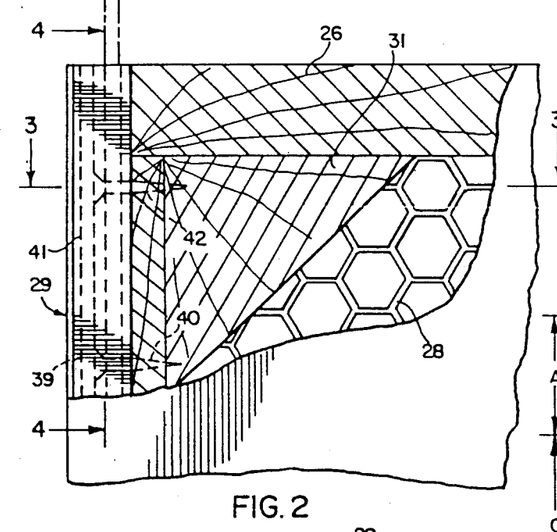
FIG. 2 is an enlarged view of one corner of a panel with the facing material cut away.
Figure 3:
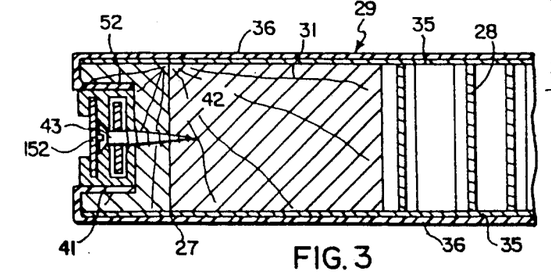
FIG. 3 is a sectional view taken on line 3—3 of FIG. 2.
Figure 4:
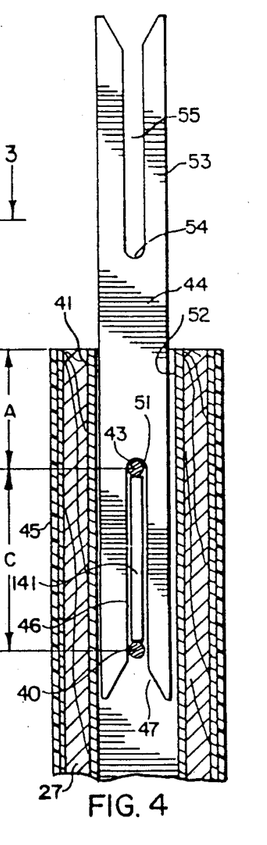
FIG. 4 is a sectional view taken on line 4—of FIG. 2 with a connector element inserted.

The typical panel structure is shown in FIGS. 2-4. The frame of panel 29 is contemplated as being made of wood or other rigid material comprising elements 26 and 27 and a lightweight honeycomb core 28 with appropriate corner stiffener or fillet elements 31. The rigid end member 27 may be comprised of a single grooved element or it may be built up of separate elongated strips. An appropriate semi-stiff covering material 35 is coextensive with a broad side of the panel 29 and preferably a soft fabric covering 36 made in decorator colors provides the outer surface of the panel. Two opposite edges of the frame member of panel 29 are formed with a groove for receiving channel member 41. The channel member is formed of a rigid material, preferably extruded lightweight aluminum or equivalent. However, it is possible that the channel member could be made of a rigid plastic of suitable strength characteristics. Channel member 41 is anchored to frame member 27 by any appropriate means such as one or more screws 39, 42 having respective shanks 40, 43. Screw 42 adjacent either end of channel member 41 on panel 29 is located a distance A (FIG. 4) or B (FIG. 21) from the end of the channel and consequently from the abutting edge of the panel. Screw 39 spaced further into the channel is located a distance C from screw 42.

The connector elements and their function will be described with respect to FIGS. 4-20. The simple double-ended flat bar element 44 shown in FIG. 4 is employed for rigid edge-to-edge interconnection of two adjacent panels in planar configuration. End 45 of bar 44 is formed with a slot 46 having an enlarged tapered entryway 47, slot 46 having a blind inner end 51. The slot 46 in connector element 44 is dimensioned to closely engage the shanks of screws 39, 40, but normally the connector element will fit into channel 52 relatively loosely to facilitate panel interconnection. As shown in FIG. 4, connector element 44 is inserted into channel 52 (see FIGS. 3 and 17) until end 51 of slot 46 engages shank 43 of screw 42. At this point the shanks of both screws are engaged by the confronting edges of slot 46 so that connector element 44 remains positively oriented as shown in FIG. 4. It is contemplated that connector 44 will slide securely, but with minimum friction over the two screw shafts in such a manner as to assure alignment and rigidity of stacking components. Screw 39 may be termed guide means while screw 42 may be termed stop means. Another panel 29 having identical channel structure as the panel portion shown in FIG. 4 can be stacked on top of the panel with the lower end of this channel member engaging the upper end 53 of bar 44 with equivalent screw shanks engaging blind end 54 of slot 55. A similar structure exists at the other end of the panel so that when two panels are placed together with abutting edges, their opposite edge channel members are joined by two identical connector elements 44. Note with respect to FIG. 5 that such connector elements 44 would be used to join the distal ends of two stacked panels at their common ends 57, 58.

Figure 6:
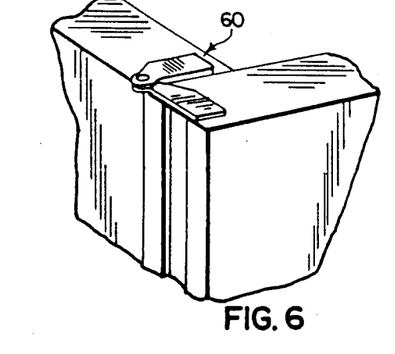
FIG. 6 is an enlarged view of joint 6 of FIG. 5.
Figures 13, 15:
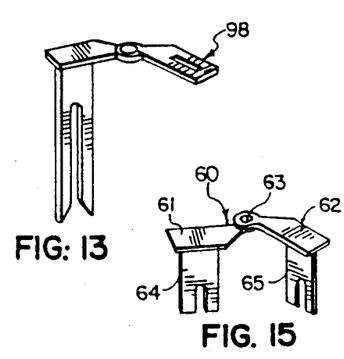
FIG. 13 is a perspective view of an alternative connector similar to that of FIG. 12.
FIG. 15 a perspective view of the connector element used in joint 6.

In order to create joint 6 as shown in FIG. 6, the connector element 60 of FIG. 15 is employed. This connector comprises two flat elements 61, 62 interconnected by means of a hinge structure 63 allowing one element to pivot with respect to the other. Fixed to one side of each flat element 61, 62 are slotted bars 64, 65 respectively, each formed in the manner of bar 44 but having one half the length of that bar. Respective element pairs 61, 64 and 62, 65 are interconnected by appropriate means such as welding. When it is desired to create a corner structure like that shown in FIG. 6, the connector element of FIG. 15 is inserted in two adjacent panels with slotted bar members 64, 65 projecting into the respective channel members and engaging the shanks of screws 42 mounted in the frames of the panels. This affords a smooth or closed outer corner structure.

Figure 7:
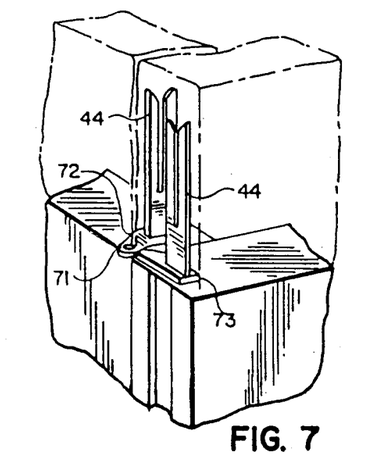
FIG. 7 is an enlarged view of joint 7 of FIG. 5.
Figure 14:
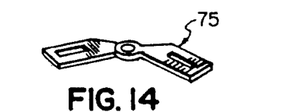
FIG. 14 a perspective view of the connector element used in joint 11.

To form the joint 7 as shown in FIG. 7, the connector device 71 is formed of hinged flat elements 72 and 73 substantially similar to elements 61 and 62 of FIG. 15, but with slots therethrough in the manner of the hinged elements of FIG. 14. This is an example of where it is desired to have the interconnection of two panels with the channel edge of one panel abutting the broad side of the other panel adjacent the channel end along the rigid frame area, forming a smooth outer corner. The total connecting device of the FIG. 7 configuration comprises hinged element 71 formed of slotted members 72 and 73 and two double-slotted bars 44. Joint 7 is formed by inserting one end of each bar 44 in the adjacent panels and then slipping the slotted hinged elements 72 and 73 over the projecting ends of slotted bars 44. Second panels 29 are then connected in the same manner above the panels shown in FIG. 7 to complete the outside corner shown in FIG. 5.

Figure 10:
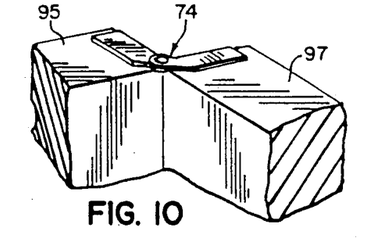
FIG. 10 is an enlarged view of joint 10 of FIG. 5.
Figure 11:
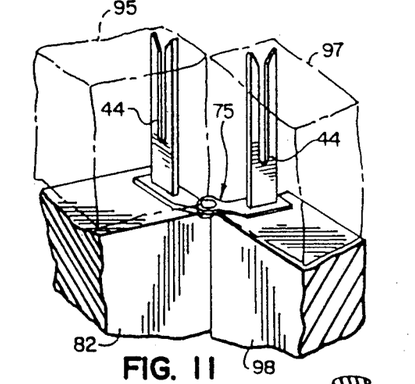
FIG. 11 is an enlarged view of joint 11 of FIG. 5.
Figure 12:
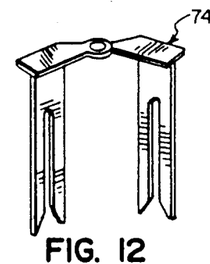
FIG. 12 is a perspective view of the connector element used in joint 10.

Another corner structure slightly different from that of FIGS. 6 and 7 is shown in FIGS. 10 and 11 employing the connector devices of FIGS. 12 and 14. FIG. 12 shows a hinged element 74 much like that of FIG. 15 except that it results in a corner appearing finished from the inside rather than the outside as seen in FIGS. 6 and 7. Otherwise the element of FIG. 12 operates in a manner identical with that of FIG. 15. Similarly, connector 75 of FIG. 14 functions together with two bars 44 to form the joint shown in FIG. 11 in a manner similar to that shown in FIG. 7.

Figure 8:
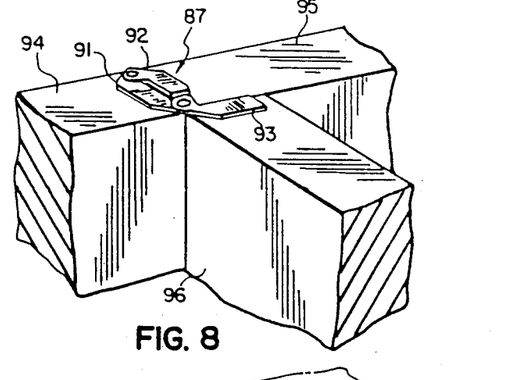
FIG. 8 is an enlarged view of joint 8 of FIG. 5.
Figure 9:
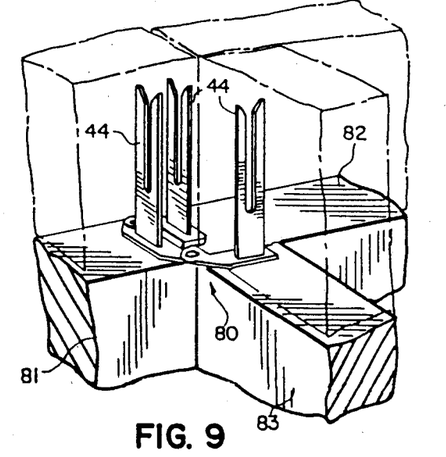
FIG. 9 is an enlarged view of joint 9 of FIG. 5.
Figure 16:
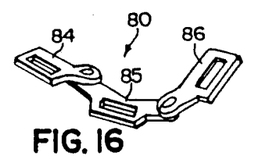
FIG. 16 is a perspective view of the connector element used in joint 9.
Figure 17:
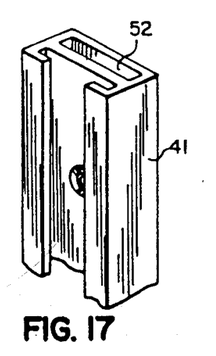
FIG. 17 is an enlarged fragmentary perspective view of a portion of channel element shown in FIG. 3.

A T-shaped junction is depicted in FIGS. 8 and 9 and employs the triple-hinged element 80 of FIG. 16 together with a triple-hinged element 87 configured as a combination of FIG. 16 and FIG. 12. By means of the device of FIG. 16, together with three double-slotted bars 44, two panel members 81, 82 are interconnected in end-to-end abutment and these panels are further interconnected in side-to-end abutment with panel 83. Hinged element 80 is formed of three mutually hinged flat slotted members 84, 85 and 86 with the resulting relationship forming the joint of FIG. 9. Similarly, the joint of FIG. 8 is formed of a connector 87 having three flat elements 91, 92 and 93, each attached to three half length slotted bars extending downwardly from the flat hinged members and projecting into the channels at the adjacent edges of panels 94, 95 and 96.

Figure 5:
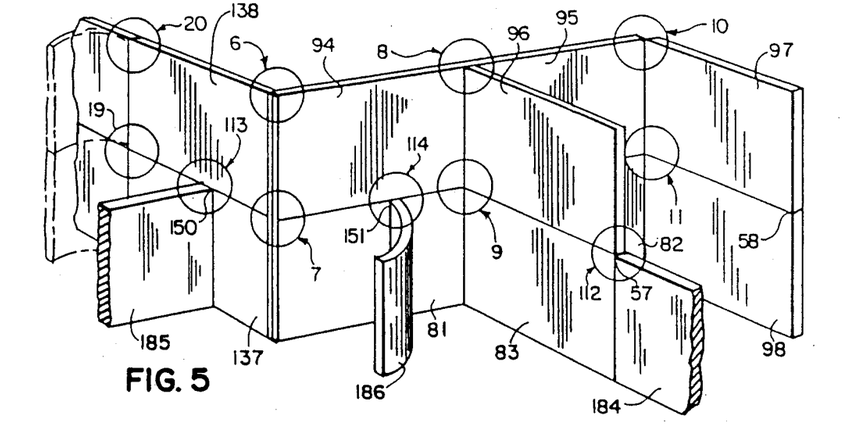
FIG. 5 is a perspective view of an assembly of panels with a variety of types of joints.

To make a stepped corner junction, that is, by placing a panel 29 on top of panel 97 of FIG. 5, the connecting element 98 of FIG. 13 would be used. This would provide a finished structure for the top right hand corner of panel 95 and would provide, in conjunction with a double-slotted bar 44, means for connecting a panel vertically on top of panel 97. Of course, a double-slotted bar 44 would be used to interconnect the right hand end of such a panel with panel 97, as was done at joint 58.

Figure 18:
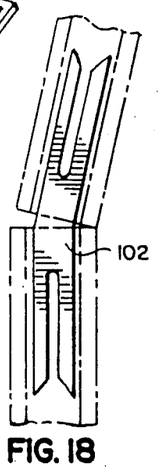
FIG. 18 illustrates a connector element for joining two panels at angle.

It should be noted that the flat rigid connector bar may be formed at any desired angle as shown in FIG. 18 where bar 102 has a relatively small angle which may be used to create the canopy structure 25 of FIG. 1.

Figure 21:
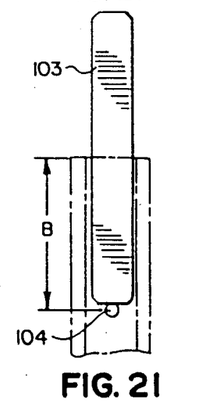
FIG. 21 shows an alternative connector element similar to that of FIG. 4.

A modified structure is shown in FIG. 21 where a plain flat bar 103 is inserted into slots in the channel members. The stop means, abutting pins 104, are placed somewhat further from the open end of the channel but stability is maintained because the channel is configured to closely confine bar 103.

Figure 19:
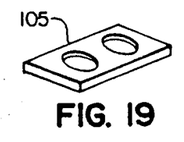
FIG. 19 is a perspective view of an alternative connector element similar to that of FIG. 14 for straight wall connection 19.
Figure 20:
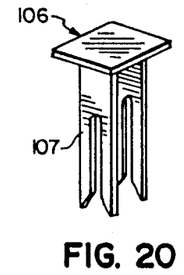
FIG. 20 is a perspective view of an alternative connector element similar to that of FIG. 12 for straight wall connection 20.
Figure 22:
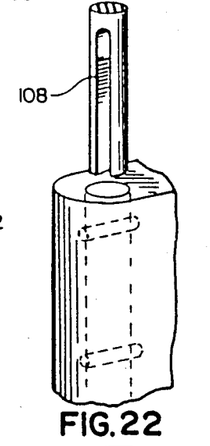
FIG. 22 depicts yet another alternative connector element similar to that of FIG. 4.
Figure 23:
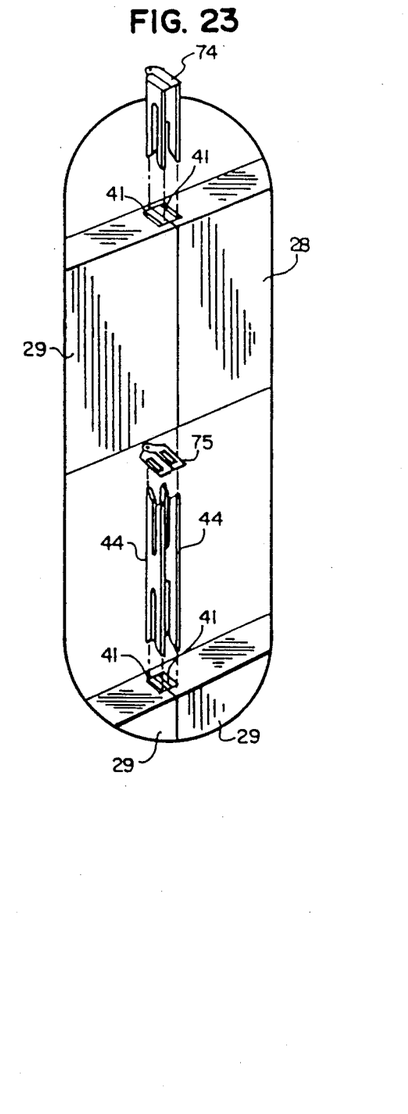
Figures 24, 25:
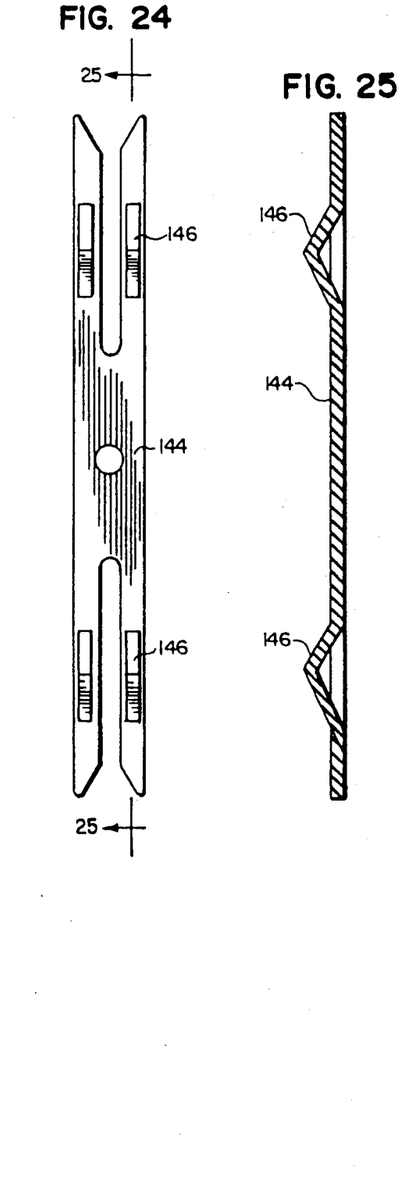
Figure 26:
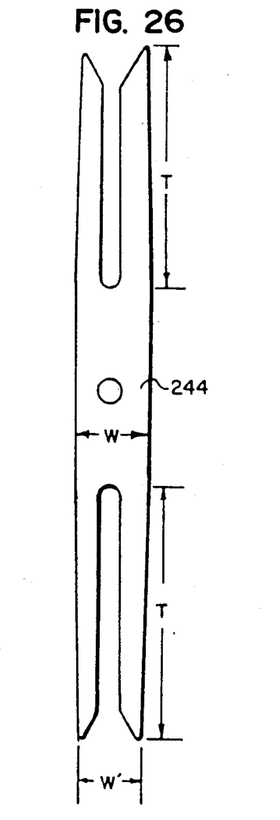
Figure 27:
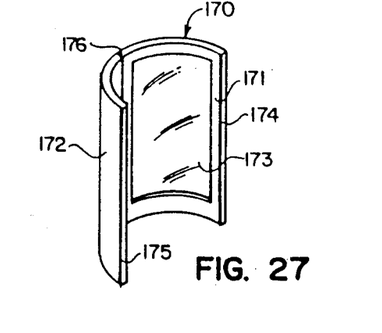

Another modification is shown in FIG. 22 where the slotted connecting member 108 is not a flat bar but is a cylindrical rod. It could as well have a square, rectangular or any other cross section, but in any case it should preferably have a slot functioning together with the two screw shanks as in FIG. 4.

Where one does not desire a hinged connection of two adjacent panels, elements 105 and 106 shown in FIGS. 19 and 20 respectively, may be used. Joint 19 in FIG. 5 employs connector element 105 together with two flat bars 44. Connector element 106, a flat plate with two fixed parallel half length bars 107, provides the top connector of joint 20.

It should be appreciated that elements such as hinged member 80 of FIG. 16 can be turned over to provide a joint such as that shown in FIG. 9 but with panel 83 abutting the surface of panel 81 instead of panel 82. Similarly, various combinations of hinged and fixed horizontal elements together with full and attached half length flat elongated bar elements may be created to satisfy different requirements for different structures. Other reversals of the various connector elements provide complete versatility to enable one to construct a booth or similar structure with all of the complexity of that shown in FIG. 1 or even structures of greater extent and complexity.

An opaque, light weight, honeycomb structure is shown for the panels of this invention. The area inside the rigid frame could also be transparent, completely open or have partial sliding panels to provide openings as desired. For possibly ultimate modularity, all of the panels would be relatively small and of the same size. However, if the panels have modular dimensions, such as being whole integer multiples of a certain length, significant modularity is available. Taking human factors into consideration, a 19-inch module is desirable. The primary requirements of this invention are substantially rigid modular frames with channel members along their edges, and connecting elements adapted to fit into the channels to interconnect adjacent panels.

In view of the above description, it is likely that modifications and improvements will occur to those skilled in the art which are within the scope of the appended claims.

What is claimed is:

1. A modular full bleed panel and connective hardware system from which a variety of structures with shapes characteristic of wall segments, booths and the like may be rapidly assembled, said system comprising:
   a. a plurality of full bleed panels of modular dimensions which may be connected vertically and horizontally, each panel comprising:
      i. a substantially rigid internal frame fully covered on its visible surfaces, said frame having two opposite vertical edges extending from top to bottom of the panel;
      ii. channel means fully recessed in each of said two opposite vertical edges of said frame for use in interconnecting the panels, said channel means in each vertical edge being formed with openings at either end thereof, said openings being at the top and bottom of said panel respectively, and positioned to enable longitudinal alignment of corresponding channel means of two panels aligned vertically, and substantially parallel alignment of two panels aligned horizontally; and
   b. a plurality of modular connector means each of which is adapted for insertion into adjacent ends of said channel means of at least two adjacent panels aligned vertically or horizontally, each connector means comprising at least two elongated, substantially rigid vertical post members and a horizontal plate member cooperating therewith, each said post member having an end adapted to extend into an open end of one of said adjacent channel means, the other end of each said post member cooperating with said plate member, said post members extending respectively into said adjacent channels of said two adjacent panels, interconnected by said plate member to provide positive, substantially rigid or hinged horizontal alignment of said two adjacent panels by connection through and at the ends of the channels; and
   c. stop means for defining the distance that each of said first and said second elongated post members may extend into said open end of one of said channel means.

2. A system according to claim 1, wherein at least one of the panels includes means for passing an electrical conduit therethrough.

3. A system according to claim 2, wherein the panel is divided into upper and lower chambers to permit passing of two different electrical conduits through the panel without interference between the two.

4. A system according to claim 2, wherein the panel has at least one removable surface for providing access to the panel interior.

5. A modular full bleed panel and connective hardware system from which a variety of structures with shapes characteristic of wall segments, booths and the like may be rapidly assembled, said system comprising:
   a. a plurality of full bleed panels of modular dimensions which may be interconnected vertically and horizontally to form vertical and horizontal pairs, respectively, each panel comprising:
      i. a substantially rigid internal frame fully covered on its visible surfaces, said frame having two opposite vertical edges extending from top to bottom of the panel;
      ii. channel means fully recessed in each of said two opposite vertical edges of said frame for use in interconnecting the panels, said channel means in each vertical edge being formed with openings at either end thereof, said openings being at the top and bottom of said panel respectively, and positioned to enable longitudinal alignment of corresponding channel means of two panels aligned vertically, and substantially parallel alignment of two panels aligned horizontally; and
   b. a plurality of modular connector means each of which is adapted for insertion into adjacent ends of said channel means of at least three adjacent panels, two of the panels being aligned as a vertical pair and two of the panels being aligned as a horizontal pair; each connector means comprising:
      i. at least one first elongated, substantially rigid vertical post member having two ends, each post member end extending into an open end of one of said adjacent channel means of said vertical pair of panels, for providing positive fixed vertical alignment of said vertical pair of panels;
      ii. at least one second elongated post member having at least one end extending from an exterior position into an open end of the channel of one panel of said horizontal pair of panels; and iii. a hinged plate member having a first part connecting to said first post member at a position between said vertical pair of panels and a second part connecting to said second post member at the exterior position to the channel into which it extends, the first and second part being pivotally interconnected for providing hinged horizontal alignment of said horizontal pair of panels by connection through and at the ends of the channels of said horizontal pair of panels; and c. stop means for defining the distance that each of said first and said second elongated post members may extend into said open end of one of said channel means.

6. A system for connecting substantially planar panels so that two panels may be rigidly connected along one edge of each panel in order to align the two panels in a coplanar vertical or horizontal position whereby either or both panels may each be hinged along another panel edge to at least one additional panel to permit a pivoting of the additional panel relative to the two coplanar panels, said system comprising:

a. a plurality of panels each with a channel means, said channel means being fully recessed in and aligned along at least one edge of the panel, presenting an opening at a first end of the panel's edge;

b. a first post member, removably insertable into the openings of two oppositely juxtaposed channel means of two panels positioned in coplanar edge-to-edge vertical or horizontal alignment, whereby the two panels may be rigidly connected in coplanar alignment;

c. a second post member removably insertable into the opening of a channel means of at least one additional panel;

d. a hinged plate member having a least a first and a second part pivotally interconnected, the first part connecting to the first post member and the second part connecting to the second post member, whereby when the first and the second post members are inserted into the respective openings of the channel means of the panels, the additional panel is connected pivotally to two rigidly connected panels at the hinged plate member.

7. The system according to claim 6 wherein the hinged plate member interconnects the first post member with the second post member by connecting to the first post member at a position between the two rigidly connected panels and by connecting to the second post member at a position such that when the second post member is inserted into the opening of a channel means of at least one additional panel, the hinge member is located exterior to the opening.

8. The system according to claim 6 wherein the plurality of panels numbers three and wherein the second post member is permanently connected to the hinged plate member.

9. The system according to claim 8 wherein the first post member disconnects from the hinged plate member.

10. The system according to claim 6
wherein the plurality of panels numbers four;
wherein the second post member is identical to the first post member and is removably insertable into the openings of two oppositely juxtaposed channels of two of the four panels positioned in coplanar edge-to-edge alignment, whereby the two panels may be rigidly connected in coplanar alignment; and wherein the hinged plate member removably fastens to the first post member and the second post member at a position between the respective panels rigidly connected by the respective post member, whereby the two panels rigidly connected by the first post member pivot relative to the two panels rigidly connected by the second post member.

11. A modular panel and connective hardware system wherein panels may be selectively affixed, said system comprising:

a. a plurality of panels each comprising:
 i. a frame;
 ii. a cover for covering the frame;
 iii. at least one open-ended channel fully recessed in and along at least one edge of the covered frame;

b. a plurality of modular connector means each comprising:
 i. two elongated post members, each post member extending into two oppositely disposed open ends of the respective channels of two panels, for connecting the two panels edge-to-edge in horizontal or vertical coplanar alignment; and
 ii. a hinged plate member, interconnecting the two post members, the hinged plate member having at least a first part and a second part pivotally interconnected, the first part connecting to one of the post members and the second part connecting to the other post member, whereby the two post members, each with connected panels, pivot relative to one another.

12. The system according to claim 11
wherein the cover of the frame extends across a sufficient area of the panel to shield the channels of the panels from frontal view when the panels are connected in twos and when the post members with connected panels are pivoted; and wherein the hinged plate member is dimensioned to substantially shield it and the two post members connected to it from frontal view when the panels are connected in twos and when the post members with connected panels are pivoted.

13. In a modular construction system having panels provided with open-ended channels in at least an opposite pair of edges, posts which insert axially into the open ends of oppositely juxtaposed channels upon each of two panels in order to hold the panels in coplanar alignment, and connection plates which affix the posts of adjacent pairs of panels in order that the panel pairs may be held in angular alignment relative to each other, the improvement comprising:

the connection plates being provided with slots of a predetermined configuration for receiving the posts and the posts being removably insertable into the slots of the connection plates and being axially nonrotatable within their inserted position within either the channels or the connection plates whereby the adjacent pairs of panels are held in angular alignment.

14. The modular construction system according to claim 13 wherein the connection plates further comprise:

two parts pivotally interconnected for varying the angular alignment of the panel pairs, the alignment being determined by spreading one part into which a post in inserted from the other part into which another post in inserted, the connection plates for varying the angular alignment being of universal construction.

15. In a modular construction system having panels having channels at their vertical peripheral edges, and connectors fitting within the channels in order to assemble the panels into structures, the improvement comprising:
   a recess provided in each vertical peripheral edge for receiving the channel in a fully recessed position;
   a covering extending completely over a flat surface of the panels, making the panels full bleed, the covering extending over a corner of each panel's vertical peripheral edge and being held to the panel'edge by the channel that is recessed within the edge, whereby the recessed channels and the connectors are substantially invisible when the structures are assembled.

16. In a modular construction system having panels having channels at their vertical peripheral edges, and connectors fitting within the channels in order to assemble the panels into structures, the improvement comprising:
   the channels are recessed within the vertical peripheral edges sufficiently so that the channels and the connectors fitting within the channels are substantially invisible from at least one flat surface of the panel;
   the channels are disposed parallel to the vertical peripheral edges; and
   the connectors comprise vertical and horizontal members, the vertical members being axially insertable into the channels, and the horizontal members having at least two pivotally interconnected parts, each part being connected to a vertical member.

* * * * *